Nov. 18, 1958
K. J. JOHNSON
2,860,418
EDGE AND CENTER FINDER
Filed Oct. 29, 1956
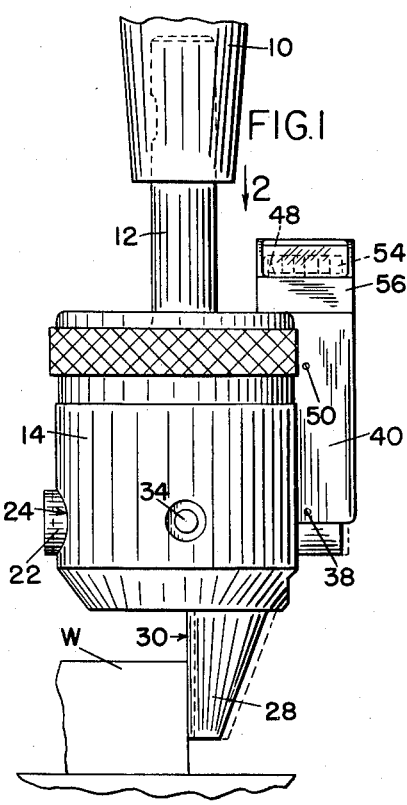
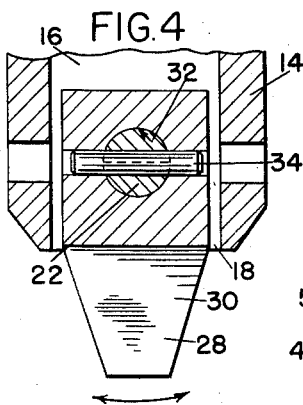
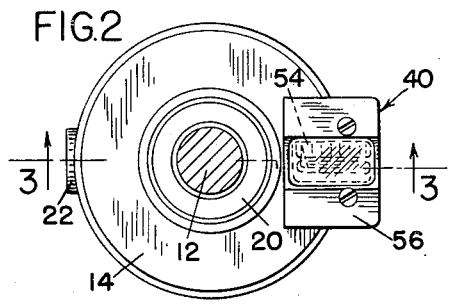
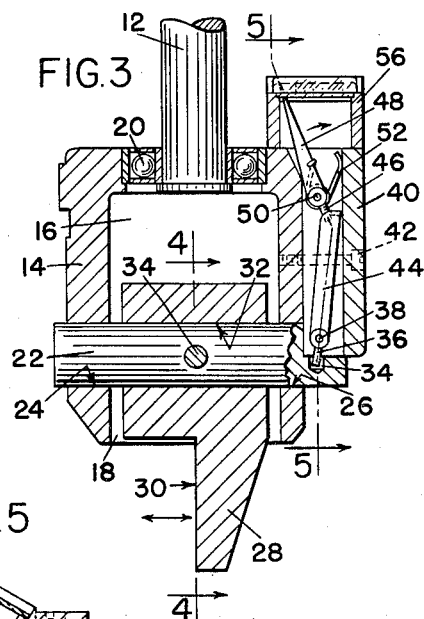
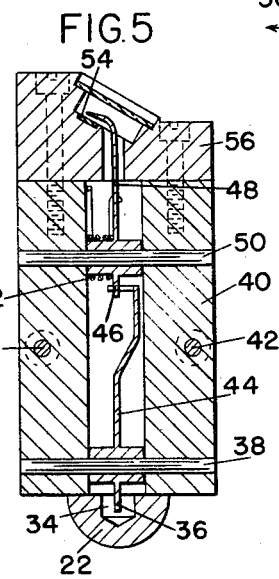
INVENTOR
KENNETH J. JOHNSON
ATTORNEY

United States Patent Office 2,860,418
Patented Nov. 18, 1958

2,860,418

EDGE AND CENTER FINDER

Kenneth J. Johnson, Marlboro, Mass.

Application October 29, 1956, Serial No. 619,027

2 Claims. (Cl. 33—172)

This invention relates to a new and improved gauge particularly of the edge finder type which can also be used for finding a center, as for instance in a hole, etc. As illustrating the present invention, it is to be noted that when it is desired to drill or bore a hole in a workpiece, it is necessary to locate the axis of the hole accurately with reference to datum such as an edge or another hole, and therefore it is necessary to accurately locate such datum with reference to the tool shaft such as for instance in a vertical spindle, milling machine, borer or the like.

It is the principal object of the present invention to provide a very accurate directly readable gauge of the class described which is relatively simple and inexpensive to manufacture and is at the same time extremely rugged and long-lasting in operation without loss of accuracy; the provision of a device of the class described having a rotary shaft which may be applied to the chuck of a spindle so that the spindle may be rotated without rotating the gauge to determine the "run-out" of the spindle in order to increase the accuracy of the operation, etc.; and the provision of a gauge as above described including a relatively rigid inverted thimble or the like in which is mounted a finger or gauge device which is connected with a linkage for directly determining the edge or center of the hole very accurately, the linkage cooperating with a scale mounted upon the thimble and the thimble having a bearing for the mounting of a shaft, which shaft is adapted to be held in the chuck of a spindle or the like, the relationship of which to the work is to be determined.

Other objects and advantages of the invention will appear hereinafter.

Reference is to be had to the accompanying drawings, in which

Fig. 1 is a view in elevation showing the device and the operation thereof;

Fig. 2 is a plan view, looking in the direction of arrow 2 in Fig. 1 part being in section;

Fig. 3 is a section on line 3—3 of Fig. 2; and

Figs. 4 and 5 are sections on the respective lines in Fig. 3.

In Fig. 1, the reference character 10 indicates a conventional chuck of any type which may be mounted on a drill spindle, milling machine head, or any machine tool. The reference numeral 12 indicates a rotary shaft which is a part of the present device and is to be inserted in the chuck 10 to be grasped thereby in the use of the gauge to be described below.

The gauge comprises in general an inverted thimble 14 having an interior chamber 16 which is open at the bottom as at 18 and is closed at the top by a bearing 20 which receives and supports spindle 12, it being seen therefore that shaft 12 is rotatable with respect to the spindle while supporting the thimble. The thimble is preferably made strong and rugged.

The thimble is provided with a diametrically extending bar or rod 22 which is of appreciable diameter, so that it is strong and rigid and is endwise movable through a pair of bores diametrically opposed in the walls of the thimble, one such bore being indicated at 24 and the other at 26.

A depending half or semi-conical finger 28 having a flat surface 30 centrally thereof is mounted upon the rod 22 by means of a bore through the same at 32 and a pin 34 is applied to connect the base of the semi-conical finger to the rod 22, so that the parts will move generally together.

The rod 22 preferably extends outwardly from the thimble at both ends thereof as clearly seen in Figs. 1 and 3 and at one end said rod is provided with a recess 34 into which extends the lower end portion of a link as at 36. This link is pivoted at 38 in a supplementary housing 40 which may be secured to the thimble 14 by means of a pair of screws such as those shown at 42.

The link itself is indicated at 44 and extends upwardly to engage the lower end 46 of another link 48 pivoted at 50 in the housing 40 and being provided with a double-ended coil spring 52 biasing the same to the left in Figs. 1 and 3. When the link 48 is moved in a right-hand or clockwise direction, it sweeps over a scale 54 and the upper end of link 48 and the scale are located in a cap 56 which may be secured to the casing 40 or may be made integral therewith.

The lower end 36 of link 44 is loosely mounted in the recess 34 in rod 22, but the operation of the scale is extremely accurate nevertheless since when the semi-conical gauge finger 28 is moved into edge contact relationship with the workpiece W, the finger must be moved back slightly say to the dotted line position in Fig. 1 against the action of the spring, to find the exact central plane of the spindle on which the chuck 10 is mounted. In other words, when the gauge finger 28 is at rest, it is not accurately aligned with the center line of the tool and the motion described above is provided to increase the accuracy and ease of operation of the device.

The semi-conical gauge or finger 28 may be in the form of a full cone if desired in order to locate centers of holes; and it is to be noted that with the shaft 12 engaged with the chuck 10, the machine tool may be operated with shaft 12 rotating, and the gauge may still be maintained in fixed position in order to determine the inaccuracies in run-out of the spindle, so that the accuracy of the device is greatly enhanced.

It will be seen that this invention provides an accurate gauge which is relatively simple, rugged and long-lasting in use and which not only serves to find an edge or a center of the hole, but also it is adapted to chuck the run-out of a tool spindle or of a milling machine, etc.

In the use of the device as a hole locater, a duplicate indicator housing can be mounted on the thimble at a 90° position from that described so that readings can be taken in either of two directions.

Having thus described my invention and the advantages thereof, I do not wish to be limited to the details herein disclosed, otherwise than as set forth in the claims, but what I claim is:

1. A device of the class described comprising an inverted thimble, a shaft thereon, said thimble and shaft being axially aligned, a gauging finger extending out of the thimble opposite to the shaft, a series of interengaged links connected for pivotal operation to the finger, a housing on the thimble at the exterior thereof, said links being mounted in the housing generally parallel to the axis of the shaft, a scale in position to be swept by one link, means movably mounting the finger in the thimble, said means including an operating connection from the finger to the links, said means comprising a relatively thick bar diametrically arranged in and extending through opposite walls of the thimble and being axially movable transversely of the thimble, said finger having a bore receiving the bar, and means connecting the finger to the bar and preventing relative motion therebetween, said finger having a semi-conical shape with a diametrical flat gauging face.

2. A device of the class described comprising an inverted thimble, a shaft thereon, said thimble and shaft being axially aligned, a gauging finger extending out of the thimble opposite to the shaft, a series of interengaged links connected for pivotal operation to the finger, a housing on the thimble at the exterior thereof, said links being mounted in the housing generally parallel to the axis of the shaft, a scale in position to be swept by one link, means movably mounting the finger in the thimble, said means including an operating connection from the finger to the links, said means comprising a relatively thick bar diametrically arranged in and extending through opposite walls of the thimble and being axially movable transversely of the thimble, said finger having a bore receiving the bar, and means connecting the finger to the bar and preventing relative motion therebetween, said finger having a semi-conical shape with a diametrical flat gauging face, a recess in the bar, one link having an end loosely associated with said recess and actuated by endwise motion of the bar.

References Cited in the file of this patent

UNITED STATES PATENTS

| | | |
|---|---|---|
| 1,487,119 | Newitt | Mar. 18, 1924 |
| 2,177,399 | Aller | Oct. 24, 1939 |
| 2,303,858 | Ostberg | Dec. 1, 1942 |
| 2,327,948 | Webster | Aug. 24, 1943 |
| 2,731,726 | Timpner | Jan. 24, 1956 |